G. O. CROMWELL.
ELECTRICALLY HEATED MELTING POT FOR TYPOGRAPH MACHINES.
APPLICATION FILED JULY 8, 1916.
1,414,689.
Patented May 2, 1922.
3 SHEETS—SHEET 1.
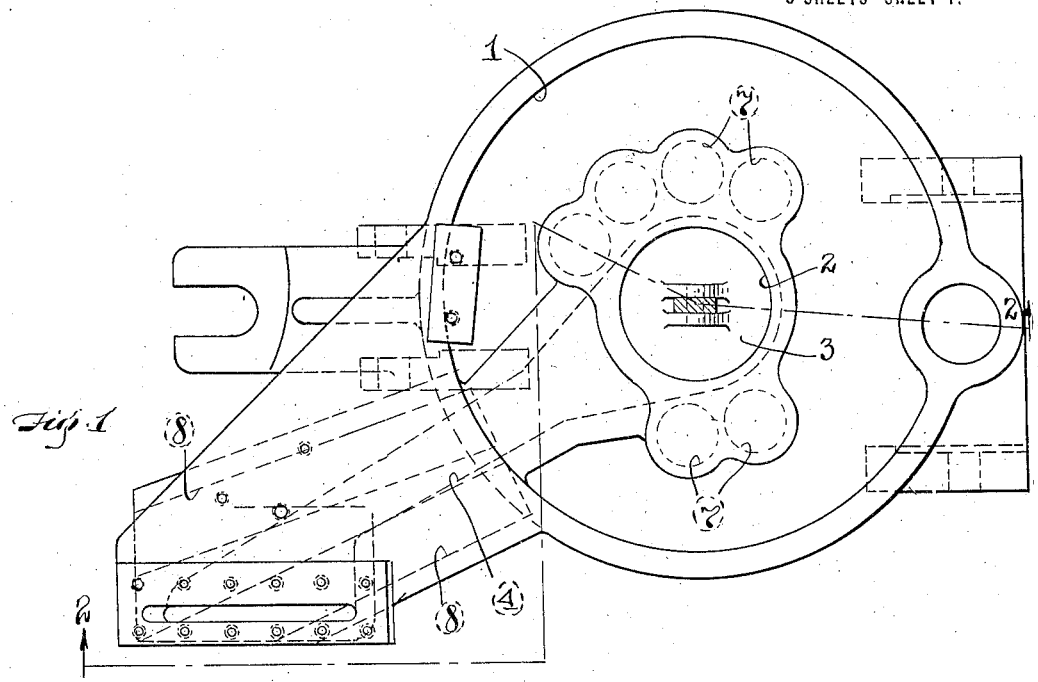
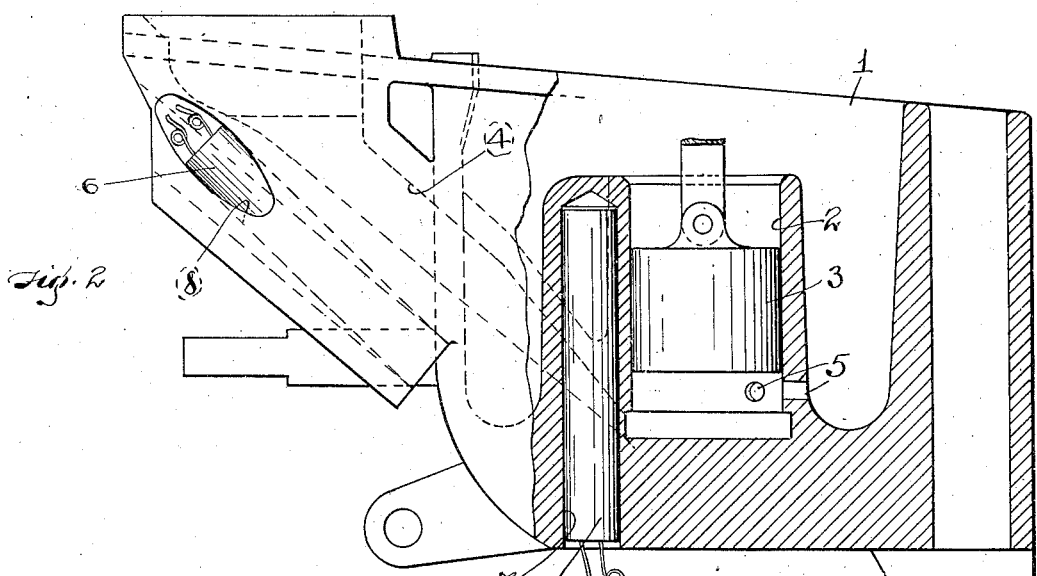
WITNESSES
O. M. Kappler
Thos. H. Day
INVENTOR
George O. Cromwell
BY Fay, Oberlin & Fay
ATTORNEYS

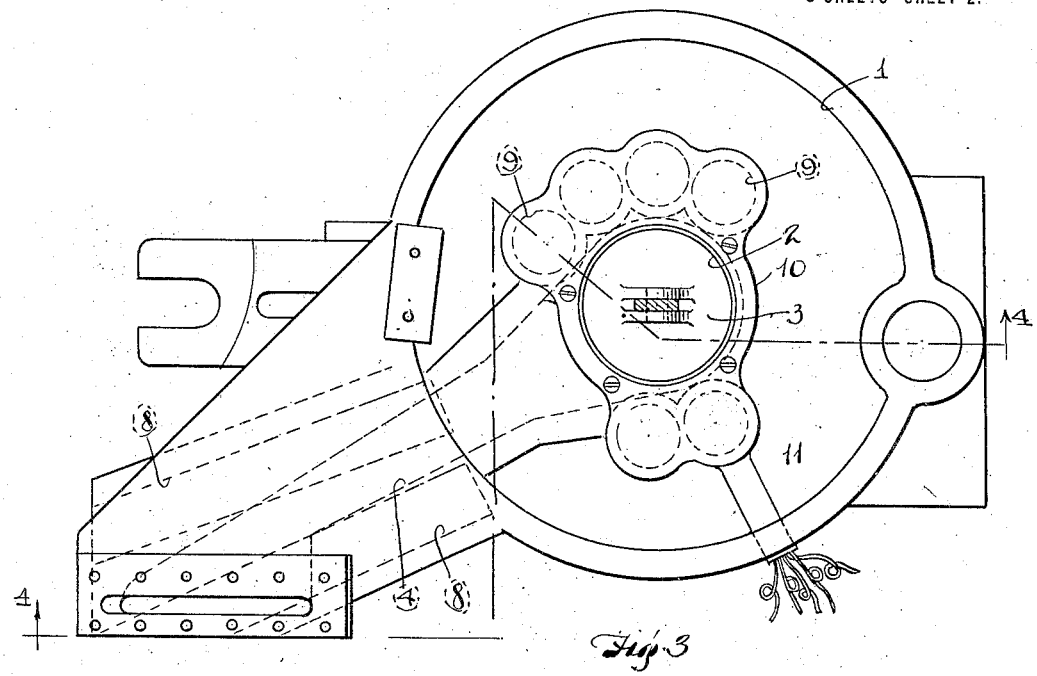
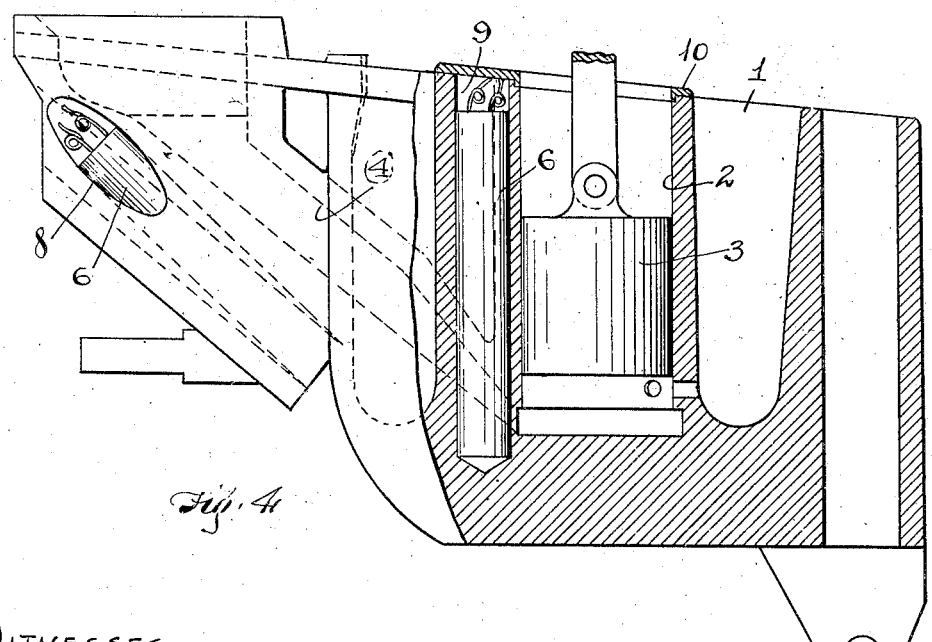

G. O. CROMWELL.
ELECTRICALLY HEATED MELTING POT FOR TYPOGRAPH MACHINES.
APPLICATION FILED JULY 8, 1916.

1,414,689.

Patented May 2, 1922.

3 SHEETS—SHEET 3.

WITNESSES=
O. M. Kappler
Thos. H. Fay

INVENTOR
George O. Cromwell
BY Fay, Oberlin & Fay
ATTORNEYS

UNITED STATES PATENT OFFICE.

GEORGE O. CROMWELL, OF CHICAGO, ILLINOIS, ASSIGNOR, BY MESNE ASSIGNMENTS, TO LUDLOW TYPOGRAPH COMPANY, OF CHICAGO, ILLINOIS, A CORPORATION OF ILLINOIS.

ELECTRICALLY-HEATED MELTING POT FOR TYPOGRAPH MACHINES.

1,414,689.        Specification of Letters Patent.    Patented May 2, 1922.

Application filed July 8, 1916. Serial No. 108,138.

*To all whom it may concern:*

Be it known that I, GEORGE O. CROMWELL, a citizen of the United States, and a resident of Chicago, county of Cook, and State of Illinois, have invented a new and useful Improvement in Electrically-Heated Melting Pots for Typograph Machines, of which the following is a specification, the principle of the invention being herein explained and the best mode in which I have contemplated applying that principle, so as to distinguish it from other inventions.

Numerous attempts have been made to utilize a heating electric current in connection with the melting pots of typograph machines in place of the familiar gas burner, the advantages in the use of electricity in this connection being obvious. On account of the fact, however, that such pot requires to be movably mounted and the further fact that the space available is rather cramped, no particular success has been achieved in this undertaking.

The object of the present invention, accordingly, is to provide electrical heating means for such melting pots, which will be sufficiently compact to be included in the structure without adding materially to the space occupied thereby. A further object is to provide means of this sort, which may be readily controlled to supply varying degrees of heat, it being understood that more heat may be required initially in order to melt a charge, than to maintain the metal in desired molten condition, while the typograph machine is running. To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 5:
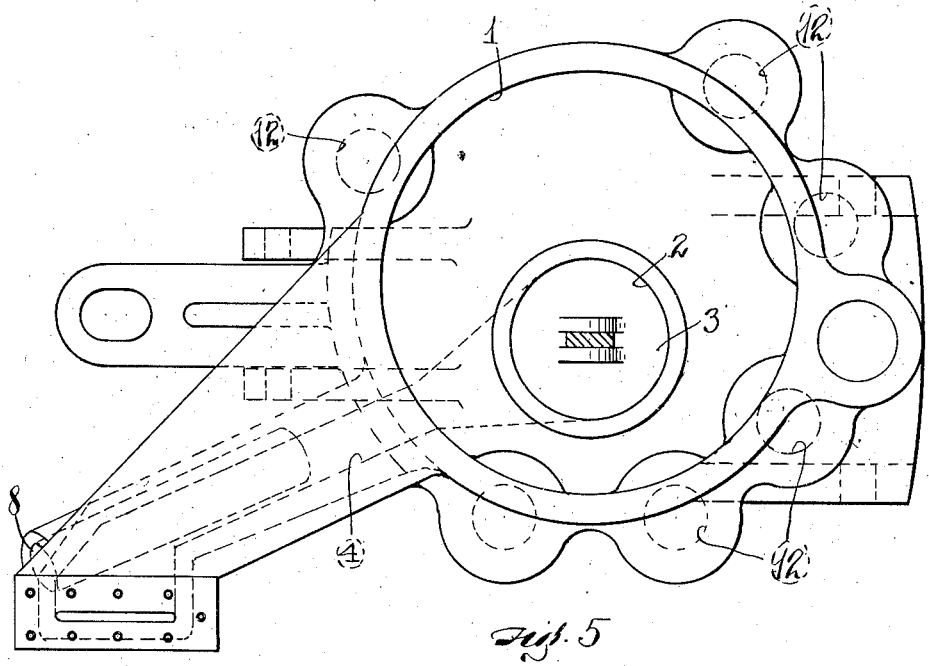
Figure 6:
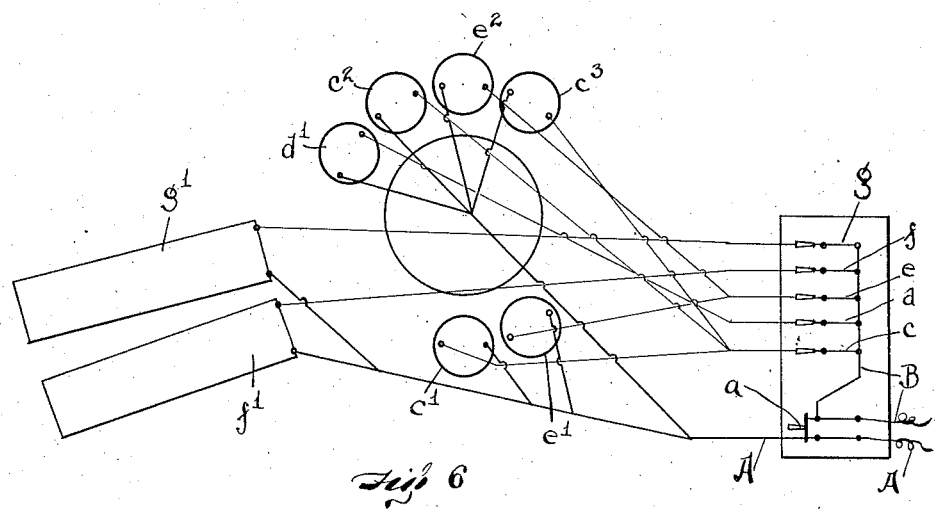

Figure 1 is a plan view of a melting pot of the character in question, showing my improved electrical heating means included therein; Figure 2 is partly a side elevation and partly a vertical section of the same, the plane of the section being indicated by the line 2—2, Figure 1; Figure 3 is a plan view similar to Figure 1 but showing a modified construction; Figure 4 is a view of such modified construction similar to that of Figure 2, the plane of the section being indicated by the line 4—4, Figure 3; Figure 5 is a plan view, similar to Figure 1, of yet another modified construction; and Figure 6 is a diagrammatic view of the wiring connections, more especially of the two forms of construction illustrated in Figures 1 and 2, and 3 and 4 respectively.

The general form and construction of the melting pot proper, to which I have shown my improved heating means as being applied in the aforesaid drawings, are similar to those of the pot shown and described in United States Patent No. 1,124,293 to E. S. Carman, dated January 12, 1915, for improvements in casting mechanism for typographs. In other words, such pot comprises a chamber 1 adapted to contain the molten metal, such chamber being of general cylindrical form and including a sub-chamber 2 adapted to receive a piston or plunger 3. From such sub-chamber leads the spout 4, through which molten metal is forced into the mold (not shown), in the actual operation of casting. Communication between the chamber 1 and the sub-chamber 2 holding the plunger 3 is furnished by a series of apertures 5 in the wall of such latter chamber, which apertures are closed as the plunger descends.

Instead, however, of surrounding the aforesaid chamber 1 with a heating jacket and providing a gas burner or the like in connection therewith, as shown in the patent referred to above, I prefer to use electric heating means taking the form of one or the other of the several modifications illustrated in the drawings.

Such means comprise a plurality of resistance units 6, such as are obtainable on the market in the form of elongated cylindrical members, within which are embodied suitable resistance wires, so that when an electric current is passed therethrough, the member or unit rapidly becomes heated. In order to utilize the heat thus developed to the best advantage, a series of pockets 7 are provided directly in the walls of the melting pot, and additional pockets 8 are similarly provided on the under side of the spout, the heating units being snugly fitted but removably held in such pockets as shown.

In the form of construction illustrated in

Figures 1 and 2, the pockets 7 for the heating units, intended to heat the contents of the pot proper, are formed in the wall of the sub-chamber, such wall being enlarged for the purpose, and the pockets opening in the bottom of the pot, so that the units may be inserted from below, being held in place by any suitable means, as will be readily understood. Preferably two such units are placed on one side of such sub-chamber and four on the other, while two pockets 8 are provided on the under side of the spout, these opening at their upper ends for the reception of the corresponding number of units.

In the construction illustrated in Figures 3 and 4, the modification consists in having the pockets 9 associated with such sub-chamber open at their upper, instead of their lower, ends, thus rendering them more conveniently accessible for the insertion and removal of the units without defeating the primary purpose of having the heat generated directly where it is desired to apply the same. A removable cover plate 10, of general annular form normally closes the open ends of these pockets, such plate being provided with a lateral tubular extension 11, through which the conductor wires may be led beyond the edge of the pot, as shown in Figure 3. In the construction illustrated in Figure 5, instead of pockets 7 formed in the wall of the sub-chamber, pockets 12 are formed in the outer wall of the pot itself, being preferably distributed around such wall in the fashion indicated.

Inasmuch, however, as it is essential that the metal be thoroughly molten prior to its discharge through the spout, the grouping shown in Figures 1 and 3 of the pockets, and the heating units contained therein, about the sub-chamber, in which the plunger operates, is preferable to this last-described construction.

In order that the temperature of the metal may be properly regulated at all times, the heating units are desirably connected in the circuit in the fashion diagrammatically illustrated in Figure 6, which, as previously stated, shows the arrangement applicable to the two constructions shown in Figures 1 and 2, and 3 and 4, respectively. The two leads A, B, for supplying the current to the heating system, are controlled by a knife switch $a$, said lead A being thereby directly connected with all of the several units. A series of secondary switches $c$, $d$, $e$, $f$, and $g$, however, are interposed between the other lead B and the connections to the several heating units $c'$, $c^2$, $c^3$, $d'$, $e'$, $e^2$, $f'$ and $g'$ each switch controlling the connections to all of the units bearing the same letter in Figure 6. Accordingly it will be seen that each of the two units $f'$, $g'$ that are applied directly to the spout, may be separately connected in the heating circuit by switches $f$ and $g$; similarly, that by means of switch $c$ the three units $c'$, $c^2$ and $c^3$ may be thus included, such units being substantially equidistantly disposed around the wall of the central sub-chamber; and that the two units $e'$ and $e^2$ located on opposite sides of such central chamber, may be connected in the circuit by means of switch $e$, while if still more heating capacity is desired, the remaining unit, $d'$, may be thus connected in such circuit by means of switch $d$.

By reason of the location of the heating units in close operative relation to the spout and such central chamber respectively, as well as by the distribution of the separate units, controlled either singly or in a group by the switches as just described, it is readily possible to regulate the heating of the pot with extreme nicety; in fact, the heating effect of these electric units may be graduated as carefully as that of a gas burner. Moreover, even if a minimum amount of heat is required, it will be observed that such heat is uniformly distributed, as by the inclusion of one of the units $f'$ or $g'$ in conjunction with the group of units $c'$, $c^2$ and $c^3$.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a melting pot for typograph machines and the like, having a main chamber, a sub-chamber, and a spout leading from such sub-chamber; of a plurality of elongated resistance units independently removably mounted in the wall of one such chamber out of contact with the contents of the pot.

2. The combination with a melting pot for typograph machines and the like having a main chamber, a sub-chamber, and a spout leading from such sub-chamber; of a plurality of elongated vertically disposed resistance elements independently removably mounted in the wall of such sub-chamber out of contact with the contents of the pot, and others similarly mounted alongside such spout.

3. The combination with a melting pot for typograph machines and the like, having a chamber provided with a plurality of pockets; of resistance elements independently removably mounted in such pockets.

4. The combination with a melting pot for typograph machines and the like having a main chamber, a sub-chamber and a spout leading from such sub-chamber, said pot also having a plurality of vertically disposed, elongated pockets; of corresponding resistance elements independently removably held in such pockets.

5. The combination with a melting pot for typograph machines and the like having a main chamber, a sub-chamber and a spout leading from such sub-chamber, said pot also having a plurality of vertically disposed, elongated pockets adjacent such sub-chamber; of corresponding resistance elements independently removably held in such pockets.

6. The combination with a melting pot for typograph machines and the like having a main chamber, a sub-chamber and a spout leading from such sub-chamber, said pot also having a plurality of vertically disposed, elongated pockets respectively adjacent such sub-chamber and spout; of corresponding resistance elements independently removably held in such pockets.

7. The combination with a melting pot for typograph machines and the like having a main chamber, a sub-chamber, and a spout leading from such sub-chamber, said pot also having a plurality of vertically disposed, elongated pockets in the wall of such sub-chamber and others in the wall of such spout; of corresponding resistance units independently removably held in such pockets.

8. The combination with a melting pot for typograph machines and the like having a main chamber, a central sub-chamber, and a spout leading from such sub-chamber, said pot also having a plurality of vertically disposed, elongated pockets in the wall of such sub-chamber, open at their upper ends and other similar pockets in the wall of such spout; of corresponding resistance units independently removably held in such pockets.

9. The combination with a melting pot for typograph machines and the like having a main chamber, a central sub-chamber, and a spout leading from such sub-chamber, said pot also having a plurality of vertically disposed, elongated pockets in the wall of such sub-chamber, open at their upper ends and other similar pockets in the wall of such spout; of corresponding resistance units independently removably held in such pockets; and an annular cover plate for the wall of such central chamber adapted to close the pockets therein with such units in place.

10. The combination with a melting pot for typograph machines and the like, having a main chamber, a sub-chaamber, and a spout leading from such sub-chamber; of a plurality of resistance units independently removably supported in the wall of one such chamber; and independent external electrical connections for said units.

11. The combination with a melting pot for typograph machines and the like, having a main chamber, a sub-chamber, and a spout leading from such sub-chamber; of a plurality of resistance units independently removably supported in the wall of such sub-chamber; and independent external electrical connections for said units.

12. The combination with a melting pot for typograph machines and the like having a main chamber, a sub-chamber and a spout leading from such sub-chamber; of a plurality of resistance elements suitably mounted in said pot; and switches controlling the connections of different units, such units being arranged in groups with members in alternate arrangement.

13. The combination with a melting pot for typograph machines and the like, having a main chamber, a sub-chamber, and a spout leading from such sub-chamber; of a plurality of resistance units in the wall of one such chamber; independent electrical connections for said units; and switches controlling the connections of different units, such units being arranged in groups with members in alternate arrangement.

14. In apparatus of the character described, the combination of a melting pot having a main chamber, a sub-chamber, and a spout leading from the latter; a plurality of electrical resistance units disposed in the wall of one of said chambers, and another disposed alongside such spout; an electric circuit adapted to be connected with said units; a main switch controlling the connection of all of said units with one side of said circuit; and a plurality of switches controlling the connection of different units, respectively, with the other side of said circuit.

15. In apparatus of the character described, the combination of a melting pot having a main chamber, a sub-chamber, and a spout leading from the latter; a plurality of electrical resistance units disposed in the wall of one of said chambers, and another disposed alongside such spout; an electric circuit adapted to be connected with said units; a main switch controlling the connection of all of said units with one side of said circuit; and a plurality of switches controlling the connection of different units, respectively, with the other side of said circuit, such units being arranged in groups with members in alternate arrangement.

Signed by me, this 3rd day of July, 1916.

GEORGE O. CROMWELL.

Attested by—
LENA McCREERY,
W. J. McALLISTER.